United States Patent
Bäbler

(10) Patent No.: US 6,375,734 B1
(45) Date of Patent: Apr. 23, 2002

(54) DIKETO PYRROLO PYRROLE PIGMENT

(75) Inventor: Fridolin Bäbler, Hockessin, DE (US)

(73) Assignee: Ciba Specialty Chemicals Corporation, Tarrytown, NY (US)

(*) Notice: Subject to any disclaimer, the term of this patent is extended or adjusted under 35 U.S.C. 154(b) by 0 days.

(21) Appl. No.: 09/712,637

(22) Filed: Nov. 14, 2000

Related U.S. Application Data

(60) Provisional application No. 60/166,154, filed on Nov. 17, 1999.

(51) Int. Cl.[7] .......................... C09B 67/48; C09B 57/00
(52) U.S. Cl. ...................... 106/498; 106/493; 524/105; 548/453
(58) Field of Search ................ 106/493, 498; 548/453; 524/105

(56) References Cited

U.S. PATENT DOCUMENTS

| | | | |
|---|---|---|---|
| 2,857,400 A | 10/1958 | Cooper | 260/246 |
| 4,415,685 A | 11/1983 | Iqbal et al. | 524/92 |
| 4,490,542 A * | 12/1984 | Iqbal et al. | 548/453 |
| 4,579,949 A | 4/1986 | Rochat et al. | 546/167 |
| 4,992,101 A | 2/1991 | Jaffe et al. | 106/498 |
| 5,194,088 A | 3/1993 | Babler et al. | 106/412 |
| 5,522,925 A | 6/1996 | Chassot et al. | 106/498 |
| 5,565,578 A | 10/1996 | Babler | 548/453 |
| 5,693,824 A | 12/1997 | Mizuguchi et al. | 548/453 |
| 5,808,094 A * | 9/1998 | Mizuguchi et al. | 548/453 |

* cited by examiner

*Primary Examiner*—Anthony Green
(74) *Attorney, Agent, or Firm*—David R. Crichton

(57) ABSTRACT

An alpha-II form of a 1,4-diketo-3,6-di(4'-tertiary butyl phenyl)-2,5-dihydro pyrrolo[3,4-c]pyrrole pigment characterized by C.I.E color space values, particularly a high chroma value and yellow hue, in masstone, and a process for its preparation is disclosed. The 1,4-diketo-3,6-di(4'-tertiary butyl phenyl)-2,5-dihydro pyrrolo[3,4-c]pyrrole pigment is especially useful for coloring coating compositions, such as automotive paints, and plastics.

19 Claims, 2 Drawing Sheets

DIKETO PYRROLO PYRROLE PIGMENT

This application claims the benefit U.S. Provisional Application No. 60/166,154, filed Nov. 17, 1999.

The present invention relates to a diketo pyrrolo pyrrole pigment, in particular to a novel form of a 1,4-diketo-3,6-di(4-tertiary butyl phenyl)pyrrolo[3,4-c]pyrrole pigment having distinguished color characteristics and x-ray diffraction pattern, a method for its preparation and the use of the pigment in high molecular weight organic materials.

BACKGROUND

Diketo pyrrolo pyrrole pigments are well known for their bluish red to orange shades with high pigment performance, such as excellent weatherability and outstanding heat stability.

1,4-diketo-3,6-di(4'-tertiary butyl phenyl)-2,5-dihydro pyrrolo [3,4-c]pyrrole pigment of the formula I:

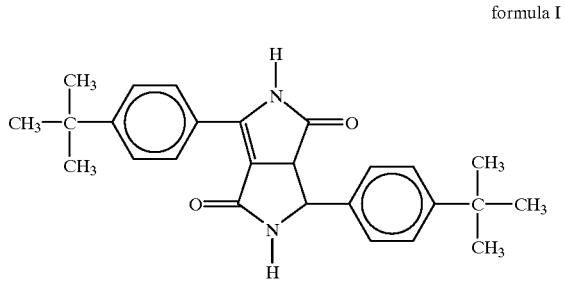

formula I was first described in U.S. Pat. No. 4,415,685 as a reddish orange pigment. U.S. Pat. No. 4,579,949 discloses a method for its preparation and describes the resulting pigment as red.

A commercially available 1,4-diketo-3,6-di(4'-tertiary butyl phenyl)-2,5-dihydro pyrrolo[3,4-c]pyrrole pigment is the IRGAZIN DPP Orange RA with the Color Index designation of C.I. Pigment Orange 73. This product shows a bright reddish orange shade and manifests a high pigment performance.

In comparison to the commercially available 1,4-diketo-3,6-di(4'-tertiary butyl phenyl)-2,5-dihydro pyrrolo[3,4-c]pyrrole pigment, the new diketo pyrrolo pyrrole pigment form shows a considerably higher chroma, a greater opacity, a yellower hue, and a different X-ray diffraction pattern.

U.S. Pat. No. 2,857,400 and U.S. Pat. No. 5,194,088, which are each incorporated herein by reference, describe finishing methods of organic pigments by premilling and after treatment in polar solvents. These patents describe the ripening of the pigment particles but do not reveal a crystal phase conversion of a diketo pyrrolo pyrrole pigment.

An organic pigment having a higher chroma is more valuable because it is more attractive and offers more styling opportunities in combination with other pigments. Thus, a difference in chroma is generally of considerable commercial importance. Due to the outstanding fastness properties, its excellent Theological properties and unique color characteristics, the pigment described herein is highly suited for use in plastics and coatings applications, particularly in automotive coating systems.

SUMMARY OF THE INVENTION

The present invention relates to a 1,4-diketo-3,6-di(4'-tertiary butyl phenyl)-2,5-dihydro pyrrolo[3,4-c]pyrrole pigment in its alpha-II form. The pigment is characterized by its C.I.E color space values in masstone of L=55–60, C=73–80, h=44–50 measured from a panel coated to complete hide with a basecoat/clearcoat paint system. More preferably, the C.I.E color space values in masstone are L=55.5–60, C=73.5–80, h=44.5–50, most preferably L=56.5–60, C=75.5–80, h=45–50.

At least 50 percent of the primary pigment particles have a particle size in the range from 0.1 to 0.5 micrometers as determined by electron micrograph. The pigment has a specific surface area of about 15±8 m$^2$/g as determined by the BET method.

The inventive pigment can be further characterized by an x-ray diffraction pattern that exhibits two strong peaks corresponding to ±0.2 two θ double glancing angles of 5.6 and 23.2, two medium strength peaks corresponding to 16.1 and 27.2, and eight relatively weak peaks corresponding to 12.3, 12.9, 15.4, 17.0, 17.4, 17.9, 20.9 and 24.6.

The present invention further relates to a process for the preparation of said 1,4-diketo-3,6-di(4'-tertiary butyl phenyl)-2,5-dihydro pyrrolo[3,4-c]pyrrole pigment. The process includes the steps of premilling an alpha-I form of a 1,4-diketo-3,6-di(4'-tertiary butyl phenyl)-2,5-dihydro pyrrolo[3,4-c]pyrrole pigment, followed by a conversion into the alpha-II form by an after treatment in an organic solvent, optionally in the presence of a diketo pyrrolo pyrrole- or 6,13-dihydroquinacridone derivative as a crystal size and crystal phase director. Preferably, the alpha-I form of the 1,4-diketo-3,6-di(4'-tertiary butyl phenyl)-2,5-dihydro pyrrolo[3,4-c]pyrrole pigment is obtained by reacting a succinate with a nitrile in an organic solvent and in the presence of a strong base at an elevated temperature.

The present invention further relates to a composition comprising a high molecular weight organic material and an effective pigmenting amount of the alpha-II form of the 1,4-diketo-3,6-di(4'-tertiary butyl phenyl)-2,5-dihydro pyrrolo[3,4-c]pyrrole pigment. The high molecular weight organic material is preferably selected from the group consisting of cellulose ethers, cellulose esters, polyurethanes, polyesters, polycarbonates, polyolefins, polystyrene, polysulfones, polyamides, polycycloamides, polyimides, polyethers, polyether ketones, polyvinyl halides, polytetrafluoroethylene, acrylic and methacrylic polymers, rubber, silicone polymers, phenol/formaldehyde resins, melamine, formaldehyde resins, urea/formaldehyde resins, epoxy resins and diene rubbers or copolymers thereof and mixtures thereof. The high molecular weight organic material can be an industrial or automotive paint or ink coating.

The present invention further relates to a process for coloring a high molecular weight organic material by incorporating an effective pigmenting amount of the inventive pigment into the high molecular weight organic material.

The present invention also relates to an article of manufacture made from the composition described above, wherein the composition is calendered, cast, molded into shaped articles or processed into fibers.

DETAILED DESCRIPTION

Figure 1:
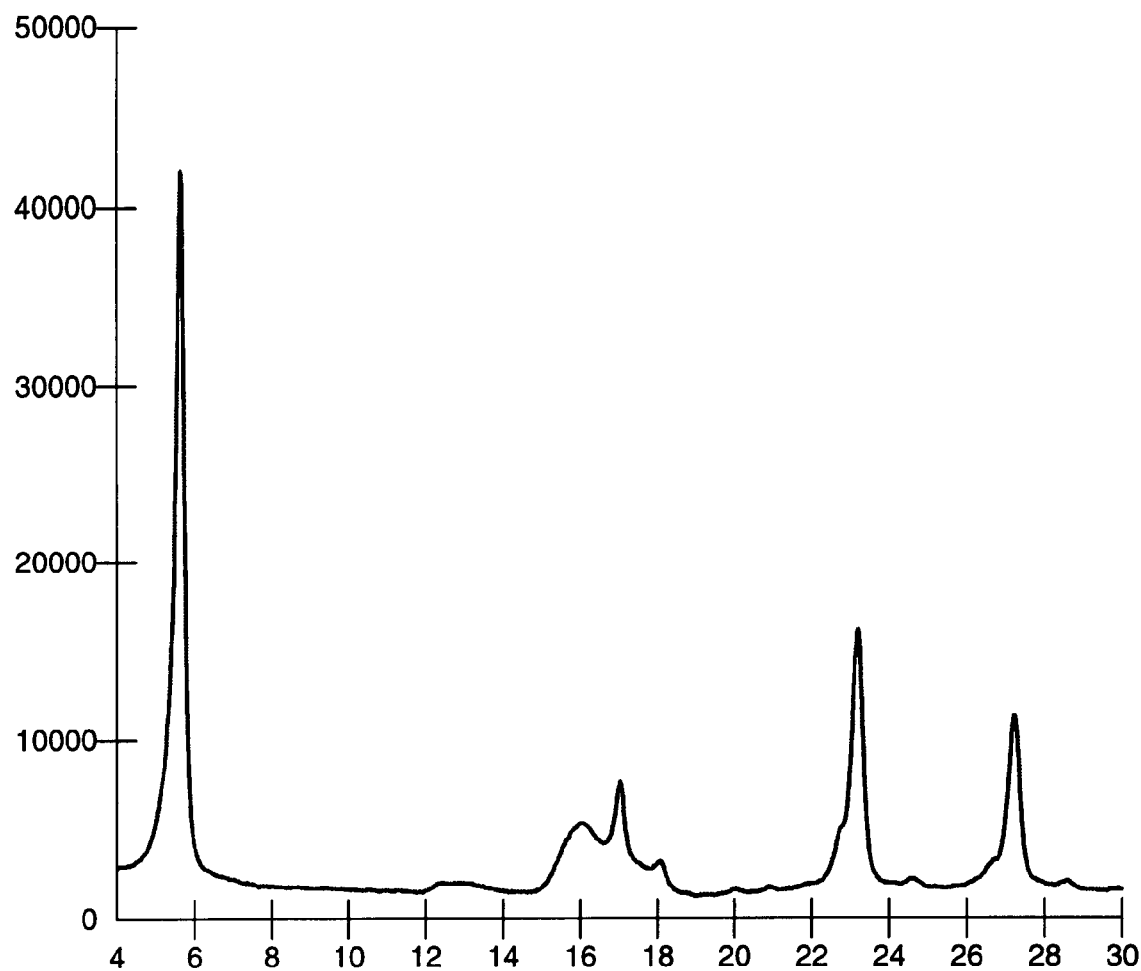
FIG. 1 is an x-ray diffraction pattern of a 1,4-diketo-3,6-di(4'-tertiary butyl phenyl)-2,5-dihydro pyrrolo[3,4-c] pyrrole pigment designated as IRGAZIN DPP Orange RA.

The present invention relates to a novel 1,4-diketo-3,6-di(4'-tertiary butyl phenyl)-2,5-dihydro pyrrolo[3,4-c]

pyrrole pigment that is specified by its color space values and its X-ray diffraction pattern. The color space values are obtained by known methods from sprayed paint panels of a pigment masstone. The color space values are defined using the 1976 CIE standard calculation as base and are expressed in L, A, B or the L, C and h numbers.

The color space values given by the common expressions of L (Lightness), C (Chroma) and h (hue) of the 1,4-diketo-3,6-di(4'-tertiary butyl phenyl)-2,5-dihydro pyrrolo[3,4-c] pyrrole pigment according to the present invention are characterized by the following numbers:

| | COLOR SPACE | | |
|---|---|---|---|
| color | Broad Range | Preferred Range | Most Preferred Range |
| L (Lightness) | 55–60 | 55.5–60 | 56.5–60 |
| C (Chroma) | 73–80 | 73.5–80 | 75.5–80 |
| h (hue) | 44–50 | 44.5–50 | 45–50 |

The color measurements were carried out in a large area view with a spectral component included using an ACS Colorimeter Program on an ACS, CS-5 Chromasensor from Applied Color Systems, Inc. and distributed by DATA COLOR International.

In order to measure the color data, the inventive pigment is first incorporated into a substrate, for example a basecoat/clearcoat paint system such as those described in Example 5 in a masstone color. The color data is then measured of the pigmented substrate, such as a coated panel or a pigmented plastic sheet. The color data is measured at "complete hide", which means that the substrate is pigmented to such an extent that any background color is not observable or detectable by the instrumentation. At "complete hide" it is not possible to see the background color of a coated panel or the background color through a pigmented plastic sheet.

Appropriate substrates include lacquers, inks, coating compositions, and plastics. Especially appropriate coating compositions include the basecoat/clearcoat systems conventionally used in the automotive industry. Especially appropriate plastics include the polyvinyl halides, especially polyvinyl chloride, and the polyolefins, for example low or linear low density or high density polyethylene and polypropylene.

A pigment masstone means that the inventive pigment is the only pigment used to color the substrate.

In comparison to the known commercially available IRGAZIN DPP Orange RA, surprisingly, the new diketo pyrrolo pyrrole pigment has a yellower hue, a greater opacity, a considerably higher chroma, and a distinguished new X-ray diffraction pattern. The new form, designated as an alpha-II form for purposes of this application, has been identified when the product is prepared by processes described in this application.

In general, the inventive pigment has a narrow particle size distribution with at least 50 percent of the particles having a primary pigment particle size in the range of from 0.1 to 0.5 μm, preferably 0.2 to 0.4 μm as shown by an electron micrograph. The inventive pigment shows a specific surface area in the range of 15±8 $m^2/g$, preferably 15±5 $m^2/g$ as determined by the BET method.

As noted above, FIGS. 1 and 2 are x-ray diffraction patterns obtained from the corresponding pigment powders. The x-axis in both of the figures represents the double glancing angles while the y-axis represents the intensity of the diffracted ray.

The inventive diketo pyrrolo pyrrole pigment in its alpha-II form shows an X-ray diffraction pattern (FIG. 2) with the main strong peaks at the same two θ double glancing angle region as the known 1,4-diketo-3,6-di(4'-tertiary butyl phenyl)-2,5-dihydro pyrrolo[3,4-c]pyrrole pigment in its alpha-I form (FIG. 1). However, the x-ray pattern of the inventive alpha-II form shows notable differences between 12 and 19 two θ double glancing angles. Thus, the inventive alpha-II form of the 1,4-diketo-3,6-di(4'-tertiary butyl phenyl)-2,5-dihydro pyrrolo[3,4-c]pyrrole pigment is characterized by an x-ray diffraction pattern that exhibits two strong peaks corresponding to ±0.2 two θ double glancing angles of 5.6 and 23.2, two medium strength peaks corresponding to 16.1 and 27.2, and eight relatively weak peaks corresponding to 12.3, 12.9, 15.4, 17.0, 17.4, 17.9, 20.9 and 24.6. The designation of strong, medium and weak is based upon a visual observation of the height of the peaks relative to one another.

The inventive diketo pyrrolo pyrrole pigment has superior pigment properties, such as high opacity, good Theological properties, heat stability and weatherability behavior, as well as a remarkably good flocculation and overlacquering resistance. It is easily dispersible and develops quickly a high color strength.

Although the inventive pigment shows excellent application properties, in order to further improve the pigment properties of the inventive diketo pyrrolo pyrrole pigment, texture-improving agents and/or anti-flocculants are optionally added before, during or after the preparatory process.

The texture-improving agent and/or anti-flocculant is preferably incorporated into the inventive diketo pyrrolo pyrrole pigment in an amount of from 0.05 to 20 percent, most preferably 1 to 10 percent, by weight, based on the combined weights of the diketo pyrrolo pyrrole pigment, texture-improving agent and/or anti-flocculant mixture.

Texture-improving agents are especially useful as an additional component which improves the properties of the inventive diketo pyrrolo pyrrole pigment. Suitable texture-improving agents include fatty acids having at least 12 carbon atoms, and amides, esters or salts of fatty acids. Typical fatty acid derived texture-improving agents include fatty acids such as stearic acid or behenic acid, and fatty amines such as laurylamine and stearylamine. In addition, fatty alcohols or ethoxylated fatty alcohols, polyols such as aliphatic 1,2-diols, glycerol mono stearate or polyvinylalcohol and epoxidized soy bean oil, waxes, resin acids and resin acid salts are suitable texture-improving agents.

Anti-flocculants are known in the pigments industry and are often also used as rheology improving agents, for example, pigment derivatives such as sulfonic acid, sulfonic acid salts like metal or quaternary alkylammonium salts or sulfonamide derivatives or the N-methyl phthalimido, N-metyl imidazolyl or N-methyl pyrazolyl derivatives. Generally, antiflocculants which are derivatives of the quinacridone or the diketo pyrrol pyrrole pigment class are preferably utilized.

Another suitable method for improving the rheological properties and heat stability is described in U.S. Pat. No. 5,522,925 in which the pigment is coated with a metal phosphate complex with the metal being zirconium, titanium or mixtures thereof.

Due to its outstanding chemical resistance, heat stability, weather and light stability, the inventive diketo pyrrolo pyrrole pigment is highly suitable for the coloration of various substrates such as inorganic materials and in particular high molecular weight organic materials. Thus, the present invention relates to a method of coloring a high molecular weight organic material which comprises incorporating an effective pigmenting amount of the inventive pigment into the high molecular weight organic material and to a composition comprising a high molecular weight organic material and an effective pigmenting amount of the inventive diketo pyrrolo pyrrole pigment.

An effective pigmenting amount is any amount suitable to provide the desired color characteristics, particularly in chroma and hue, in the high molecular weight organic material. In particular, the inventive diketo pyrrolo pyrrole pigment is used in an amount of 0.01 to 30% by weight, preferably 0.1 to 10% by weight, based on the weight of the high molecular weight organic material to be pigmented.

The pigmented, high molecular weight organic materials which are colored with the inventive pigment are useful in a variety of applications. For example, the inventive pigment is useful for the pigmentation of lacquers, inks, enamel coating compositions and thermoplastic or thermoset polymers.

The high molecular weight organic materials which are colored with the inventive pigment are, for example, cellulose ethers, cellulose esters, polyurethanes, polyesters, polycarbonates, polyolefins, polystyrene, polysulfones, polyamides, polycycloamides, polyimides, polyethers, polyether ketones, polyvinyl halides, polytetrafluoroethylene, acrylic and methacrylic polymers, rubber, silicone polymers, phenol/formaldehyde resins, melamine, formaldehyde resins, urea/formaldehyde resins, epoxy resins and diene rubbers or copolymers thereof.

High molecular weight organic materials which are useful for heat-curable coatings or cross-linked, chemically-reactive coatings, are also colored with the inventive pigment. The pigmented, high molecular weight organic materials prepared according to the present invention are especially useful in finishes which contain customary binders and which are reactive at high temperature. These finishes can be obtained from solvent or aqueous or powder paint systems known in the art. Examples of pigmented, high molecular weight organic materials which are used in coatings include acrylic, alkyd, epoxy, phenolic, melamine, urea, polyester, polyurethane, blocked isocyanate, benzoguanamine or cellulose ester resins, or combinations thereof. The pigmented, high molecular weight organic materials prepared according to the present invention are also useful as air-drying or physically-drying coatings for example in cosmetics use.

The inventive diketo pyrrolo pyrrole pigment is particularly suitable for preparing coatings conventionally employed in the automobile industry, especially in acrylic/melamine resin, alkyd/melamine resin or thermoplastic acrylic resin systems, as well as in aqueous based coating systems.

Coatings and ink systems colored with the inventive diketo pyrrolo pyrrole pigment possess a high gloss, excellent heat, light and weather fastness, as well as bleed and over spraying fastness properties.

The inventive pigment can be prepared by any method capable of producing the alpha-II form of the 1,4-diketo-3,6-di(4'-tertiary butyl phenyl)-2,5-dihydro pyrrolo[3,4-c] pyrrole pigment, provided that the above-described pigment properties and color characteristics are obtained. Suitable methods are, for example, finishing processes which start from the alpha-I form of the 1,4-diketo-3,6-di(4'-tertiary butyl phenyl)-2,5-dihydro pyrrolo[3,4-c]pyrrole prepared according to a method described in U.S. Pat. No. 4,579,949.

In a preferred finishing method the alpha-I form of the 1,4-diketo-3,6-di(4'-tertiary butyl phenyl)-2,5-dihydro pyrrolo[3,4-c]pyrrole pigment is converted to the alpha-II form by A) premilling the alpha-I form and B) after treatment of the resulting premill powder, which has a low crystallinity, in an organic solvent optionally, in the presence of a suitable particle growth and crystal phase director.

Any organic solvent or mixture of organic solvents can be used as a treating agent capable of converting said premilled 1,4-diketo-3,6-di(4'-tertiary butyl phenyl)-2,5-dihydro pyrrolo[3,4-c]pyrrole to the alpha-II form, provided that the above-described pigment properties and color characteristics are obtained. Preferably the organic solvent is a polar organic solvent. Suitable polar solvents are for example dimethyl acetamide, tetramethyl urea, methyl formamide, tetramethyl sulfone and highly suitable polar solvents are dimethyl sulfoxide (DMSO), dimethyl formamide (DMF) or N-methylpyrrolidone (NMP).

Depending on the selected organic solvent, the after treatment is carried out in 15 minutes to 24 hours at normal or higher pressure and at 20 to 200° C. Using the above mentioned polar solvents, the after treatment is preferably carried out in 1 to 4 hours at 30 to 60° C., and preferably, using 0.5 to 1.5 parts by weight pigment per 10 parts by weight polar solvent. Depending on the after treatment time and the temperature the inventive pigment is obtained in a smaller or larger pigment particle size.

Water can be tolerated in mixture with the organic solvent as long as the crystal phase conversion and final pigment properties according to the present invention are not negatively impacted.

The premilling of the alpha-I form by the above finishing procedure is carried out in a horizontal or a vertical bead mill such as an attritor or ball mill or in a high speed mixer known in the industry. The premilling step is controlled by assessing the width at half height of the 5.6 two θ double glancing angle peak in the X-ray diffraction pattern; the greater the width, the smaller the particle size of the premilled pigment powder. Preferably the width measured of the 5.6 peak in the X-ray diffraction pattern of the premilled powder is two to three times larger of the width of the same peak in the X-ray diffraction pattern of the starting material.

The after treatment step in the polar solvent is carried out in any suitable equipment such as a kneader or preferably a vessel with a stirrer. Contacting the premilled powder with the solvent causes the aggregated premilled pigment powder to deaggregate and undergo particle ripening and a conversion into the alpha-II form. Additionally, the solvent treatment provides a product which has a higher purity versus the starting material.

Suitable pigment particle growth and particle phase directors which can be used for the preparation of the new diketo pyrrolo pyrrole pigment form by the above described finishing procedure are for example described in pending patent applications by the named inventor herein, having serial numbers 60/118,419 and 60/118,405, both filed on Feb. 2, 1999, which are incorporated herein by reference.

Preferred pigment particle growth controllers and crystal phase directors are for example reaction products in which 1,4-diketo-3,6-diphenyl-2,5-dihydro pyrrolo[3,4-c]pyrrole of formula II or 6,13-dihydroquinacridone of formula III:

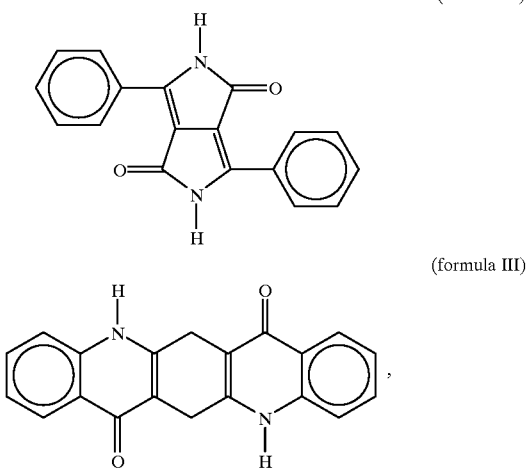

(formula II)

(formula III)

is reacted with an aromatic sulfonic acid such as benzene sulfonic acid or with a heterocyclic group such as barbituric acid or o-benzoic acid sulfimide respectively, with formaldehyde in an approximately 1 to 1 to 1 molar ratio in concentrated sulfuric acid followed by drowning in water and isolation of the reaction product.

The following examples illustrate various embodiments of the invention, but the scope of the invention is not limited thereto. In the examples, all parts are by weight unless otherwise indicated. The x-ray diffraction patterns are measured on a RIGAKU GEIGERFLEX diffractometer, type D/MaxII v BX. The coloristic data are obtained utilizing a CS-5 CHROMA SENSOR spectrophotometer as described above.

EXAMPLE 1A

A 1,4-diketo-3,6-di(4'-tertiary butyl phenyl)-2,5-dihydro pyrrolo[3,4-c]pyrrole in its alpha-I form with a particle size of 0.2 to 3 μm is premilled according to the following procedure:

A 1-SDG Attritor™ mill manufactured by Union Process, Inc. Akron, Ohio, which is fitted with L-arms and contains 3.78 liters of 0.6 cm ceramic beads grinding media with 7.5 MOH hardness, 60–65 Rockwell 45 N hardness, 3.0 kg/cm impact strength and 8500 kg/cm compressive strength. The mill is charged with 500 grams of the 1,4-diketo-3,6-di(4'-tertiary butyl phenyl)-2,5-dihydro pyrrolo[3,4-c]pyrrole crude and the pigment is milled under a nitrogen flow at a rotation speed of 500 RPM for 2 hours. At the conclusion of the milling cycle, the product is recovered by opening the valve at the bottom of the mill while rotation continues for 15 minutes yielding a orange highly aggregated powder with a low crystallinity. The width measured of the 5.6 peak in the X-ray diffraction pattern of the premilled powder is 2.8 times larger of the width of the same peak in the X-ray diffraction pattern of the starting material.

EXAMPLE 1B

A one liter flask equipped with a thermometer, stirrer and condenser was charged with 500 ml N-methyl-2-pyrrolidone (NMP) and heated to 50° C. 55 grams of the above 1,4-diketo-3,6-di(4'-tertiary butyl phenyl)-2,5-dihydro pyrrolo[3,4-c]pyrrole premilled powder obtained according to Example 1A are added. The mixture is stirred at 48–53° C. for 5 minutes whereby the suspension gets thick. 50 ml NMP are additionally added and the suspension is stirred for 2 hours at 48 to 53° C.

The resulting orange suspension is filtered. The press cake is washed with methanol followed with water and dried yielding an orange pigment which shows excellent durability and a high chroma as noted in Example 5. The X-ray diffraction pattern of the inventive alpha-II form is displayed in FIG. 2 and shows the following numeric data:

| SCATTERING ANGLE (°2θ) | RELATIVE INTENSITY (%) |
|---|---|
| 5.6 | 100 |
| 12.3 | 7 |
| 12.9 | 10 |
| 15.4 | 17 |
| 16.1 | 39 |
| 17.0 | 24 |
| 17.4 | 21 |
| 17.9 | 10 |
| 20.9 | 7 |
| 23.2 | 70 |
| 24.6 | 8 |
| 27.2 | 47 |

EXAMPLE 2

Figure 2:
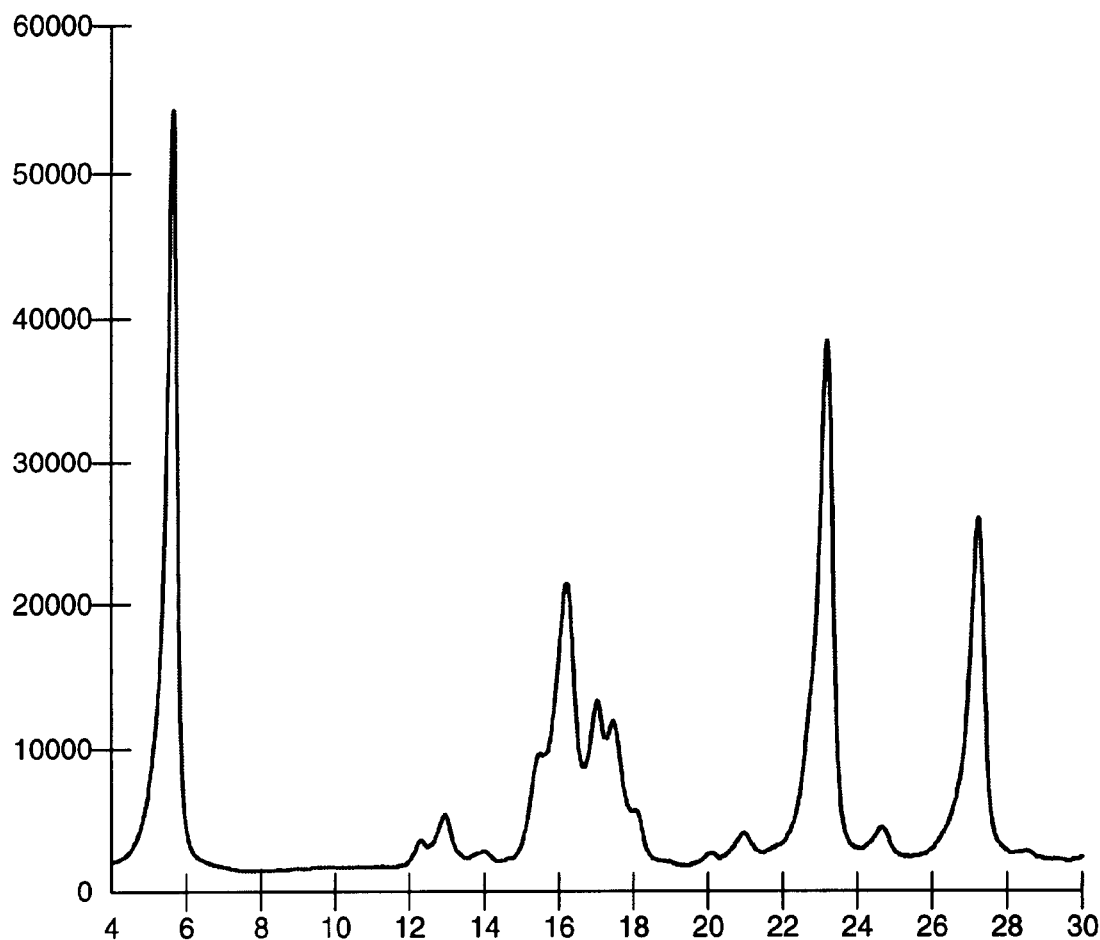
FIG. 2 is an x-ray diffraction pattern of a 1,4-diketo-3,6-di(4'-tertiary butyl phenyl)-2,5-dihydro pyrrolo[3,4-c] pyrrole pigment prepared according to the teachings herein.

The procedure of Example 1B is repeated, using instead of NMP the same amount of dimethyl sulfoxide (DMSO) as the polar solvent, yielding a 1,4-diketo3,6-di(4'-tertiary butyl phenyl)-2,5-dihydro pyrrolo[3,4-c]pyrrole with an x-ray diffraction pattern displaying a similar characteristic (FIG. 2).

When applied in paints or plastics the product shows a high chroma, high opacity, high tinting strength with an excellent durability.

EXAMPLE 3

A one liter flask equipped with a thermometer, stirrer and condenser was charged with 250 ml dimethylformamide (DMF). 25 grams of the premilled diketo pyrrolo pyrrole powder prepared according to Example 1A are added. The suspension is stirred for 3 hours at 20–25° C. The resulting orange suspension is filtered. The press cake is washed with water and dried yielding a orange pigment which shows excellent durability and a high chroma as noted in the following application examples. The X-ray diffraction pattern shows a similar characteristics as depicted in FIG. 2.

When applied in paints or plastics the product shows a high chroma, high opacity, high tinting strength with an excellent durability.

EXAMPLE 4

A one liter flask equipped with a thermometer, stirrer and condenser was charged with 0.5 grams of a o-benzoic acid sulfimide methyl-6,13-dihydroquinacridone additive in accordance with the disclosure of pending application 60/118,419, and 250 ml dimethyl sulfoxide (DMSO). The mixture was heated to 50° C. and stirred for 15 minutes at 50–53° C. 20 grams of the premilled diketo pyrrolo pyrrole powder prepared according to Example 1A are added followed by the addition of 20 ml DMSO. The suspension is stirred for 3 hours at 30–35° C. The resulting orange suspension is filtered. The press cake is washed with water and dried yielding an orange pigment which shows an x-ray diffraction pattern with the same characteristic as in FIG. 2.

When applied in paints or plastics the product shows a high chroma, high opacity, high tinting strength with an excellent durability.

EXAMPLE 5

This Example illustrates the incorporation of the inventive 1,4-diketo-3,6-di(4'-tertiary butyl phenyl)-2,5-dihydro pyrrolo[3,4-c]pyrrole pigment prepared according to Example 1B into an automotive paint system.
Millbase formulation A 16 oz jar is charged with 48 grams acrylic resin, 10.5 grams AB dispersant consisting of 45% of an acrylic resin in toluene, and 42.3 grams solvent (SOLVESSO 100 from American Chemical). 19.2 grams 1,4-diketo-3,6-di(4'-tertiary butyl phenyl)-2,5-dihydro pyrrolo[3,4-c]pyrrole pigment obtained according to Example 1B and 240 grams of 4 mm diameter glass beads are added. The mixture in the jar is shaken on a Skandex shaker for 2 hours. The millbase contains 16.0% pigment with a pigment/binder ratio of 0.5.
Masstone color 82.9 grams of the above millbase, 63.4 grams of a clear 47.8% solids unpigmented resin solvent solution containing a melamine resin catalyst, a non-aqueous dispersion resin and a UV absorber, and 28.5 grams of a clear unpigmented 58% solids unpigmented polyester urethane resin solvent solution, are mixed up.

The resin/pigment dispersion is sprayed onto a panel twice at 1 ½ minute intervals as basecoat. After 2 minutes, the clearcoat resin is sprayed twice at 1 ½ minute intervals onto the basecoat. The sprayed panel is then flashed with air in a flash cabinet for 10 minutes and then "baked" in an oven at 265° F. (129° C.) for 30 minutes, yielding an orange colored panel. The coated panel has excellent weatherability as shown by the exposure data in an ATLAS weather-O-meter.

The following color characteristic data are measured on the coated panel.

C.I.E. L*, a*, b*, C*, h* color space value numbers using a D65 illuminant and 10 degree observer with a specular component included:

L*=56.8; a*=53.3; b*=53.6; C*=75.6; h*=45.2

EXAMPLE 6

63.0 grams of polyvinyl chloride, 3.0 grams epoxidized soy bean oil, 2.0 grams of barium/cadmium heat stabilizer, 32.0 grams dioctyl phthalate and 1.0 gram of the diketo pyrrolo pyrrole pigment prepared according to Example 1B or 2 to 4 are mixed together in a glass beaker using a stirring rod. The mixture is formed into a soft PVC sheet with a thickness of about 0.4 mm by rolling for 8 minutes on a two roll laboratory mill at a temperature of 160° C., a roller speed of 25 rpm and friction of 1:1.2, by constant folding, removal and feeding. The resulting soft PVC sheet is colored in an attractive orange shade and has excellent fastness to heat, light and migration.

EXAMPLE 7

Five grams of the diketo pyrrolo pyrrole pigment prepared according to Example 1B, 2.65 grams CHIMASORB 944 LD (hindered amine light stabilizer), 1.0 gram TINUVIN 328 (benzotriazole UV absorber) and 2.0 grams IRGANOX B-215 Blend (anti-oxidant), all available from Ciba Specialty Chemicals Corporation, are mixed together with 1000 grams of high density polyethylene at a speed of 175–200 rpm for 30 seconds after flux. The fluxed, pigmented resin is chopped up while warm and malleable, and then fed through a granulator. The resulting granules are molded on an injection molder with a 5 minute dwell time and a 30 second cycle time at a temperature of 204° C. (400° F.). Homogeneously colored chips which show a saturated orange color and have excellent light stability are obtained.

EXAMPLE 8

1000 grams of polypropylene granules (DAPLEN PT-55® from Chemie Linz) and 10 grams of the diketo pyrrolo pyrrole pigment obtained in Example 1B or 2–4 are thoroughly mixed in a mixing drum. The granules so obtained are melt spun at 260–285° C. to orange filaments of good light fastness and textile fiber properties.

I claim:

1. A 1,4-diketo-3,6-di(4'-tertiary butyl phenyl)-2,5-dihydro pyrrolo[3,4-c]pyrrole pigment in its alpha-II form characterized by C.I.E color space values in masstone of L=55–60, C=73–80, h=44–50 measured from a panel coated to complete hide with a basecoat/clearcoat paint system.

2. A 1,4-diketo-3,6-di(4'-tertiary butyl phenyl)-2,5-dihydro pyrrolo[3,4-c]pyrrole pigment according to claim 1, which is characterized by C.I.E color space values in masstone of L=55.5–60, C=73.5–80, h=44.5–50, measured from a panel coated to complete hide with a basecoat/clearcoat paint system.

3. A 1,4-diketo-3,6-di(4'-tertiary butyl phenyl)-2,5-dihydro pyrrolo[3,4-c]pyrrole pigment according to claim 1, which is characterized by C.I.E color space values in masstone of L=56.5–60, C=75.5–80, h=45–50, measured from a panel coated to complete hide with a basecoat/clearcoat paint system.

4. A 1,4-diketo-3,6-di(4'-tertiary butyl phenyl)-2,5-dihydro pyrrolo[3,4-c]pyrrole pigment according to claim 1, wherein at least 50 percent of the primary pigment particles have a particle size in the range from 0.1 to 0.5 micrometers as determined by electron micrograph.

5. A 1,4-diketo-3,6-di(4'-tertiary butyl phenyl)-2,5-dihydro pyrrolo[3,4-c]pyrrole pigment according to claim 1, characterized by an x-ray diffraction pattern which exhibits two strong peaks corresponding to ±0.2 two θ double glancing angles of 5.6 and 23.2, two medium strength peaks corresponding to 16.1 and 27.2, and eight relatively weak peaks corresponding to 12.3, 12.9, 15.4, 17.0, 17.4, 17.9, 20.9 and 24.6.

6. A 1,4-diketo-3,6-di(4'-tertiary butyl phenyl)-2,5-dihydro pyrrolo[3,4-c]pyrrole pigment according to claim 1, having a specific surface area of about 27±10 $m^2/g$ as determined by the BET method.

7. A process for the preparation of a 1,4-diketo-3,6-di(4'-tertiary butyl phenyl)-2,5-dihydro pyrrolo[3,4-c]pyrrole pigment according to claim 1, wherein an alpha-I form of a 1,4-diketo-3,6-di(4'-tertiary butyl phenyl)-2,5-dihydro pyrrolo[3,4-c]pyrrole pigment is premilled and then followed by a conversion into the alpha-II form by after treatment in an organic solvent.

8. A process for the preparation of an alpha-II form of the 1,4-diketo-3,6-di(4'-tertiary butyl phenyl)-2,5-dihydro pyrrolo[3,4-c]pyrrole pigment according to claim 7, further comprising reacting a succinate with a nitrile in an organic solvent and in the presence of a strong base at an elevated temperature to produce said alpha-I form of a 1,4-diketo-3,6-di(4'-tertiary butyl phenyl)-2,5-dihydro pyrrolo[3,4-c] pyrrole pigment.

9. A process for the preparation of the alpha-II form of the 1,4-diketo-3,6-di(4'-tertiary butyl phenyl)-2,5-dihydro pyrrolo[3,4-c]pyrrole pigment according to claim 7, wherein the aftertreatment is carried out in the presence of a diketo pyrrolo pyrrole- or 6,13-dihydroquinacridone derivative as a crystal size and crystal phase director.

10. A process for the preparation of the alpha-II form of the 1,4-diketo-3,6-di(4'-tertiary butyl phenyl)-2,5-dihydro pyrrolo[3,4-c]pyrrole pigment according to claim 7, wherein the organic solvent is dimethyl acetamide, tetramethyl urea, methyl formamide, tetramethyl sulfone, dimethyl sulfoxide (DMSO), dimethyl formamide (DMF), N-methylpyrrolidone (NMP) or mixtures thereof.

11. A process for the preparation of the alpha-II form of the 1,4-diketo-3,6-di(4'-tertiary butyl phenyl)-2,5-dihydro pyrrolo[3,4-c]pyrrole pigment according to claim 10, wherein the organic solvent is DMF, DMSO, NMP or mixtures thereof.

12. A process for the preparation of the alpha-II form of the 1,4-diketo-3,6-di(4'-tertiary butyl phenyl)-2,5-dihydro pyrrolo[3,4-c]pyrrole pigment according to claim 7, wherein the after treatment is carried out at normal or higher pressures in 15 minutes to 20 hours at 20 to 200° C.

13. A process for the preparation of the alpha-II form of the 1,4-diketo-3,6-di(4'-tertiary butyl phenyl)-2,5-dihydro pyrrolo[3,4-c]pyrrole pigment according to claim 10, wherein the after treatment is carried out at normal pressure in 1 to 4 hours at 30 to 60° C.

14. A process according to claim 13, wherein 0.5 to 1.5 parts by weight pigment per 10 parts by weight polar solvent are used in the after treatment.

15. A composition comprising a high molecular weight organic material and an effective pigmenting amount of the alpha-II form of the 1,4-diketo-3,6-di(4'-tertiary butyl phenyl)-2,5-dihydro pyrrolo[3,4-c]pyrrole pigment according to claim 1.

16. A composition according to claim 15, wherein said high molecular weight organic material is selected from the group consisting of cellulose ethers, cellulose esters, polyurethanes, polyesters, polycarbonates, polyolefins, polystyrene, polysulfones, polyamides, polycycloamides, polyimides, polyethers, polyether ketones, polyvinyl halides, polytetrafluoroethylene, acrylic and methacrylic polymers, rubber, silicone polymers, phenol/formaldehyde resins, melamine, formaldehyde resins, urea/formaldehyde resins, epoxy resins and diene rubbers or copolymers thereof and mixtures thereof.

17. An article of manufacture, wherein the composition according to claim 15 is calendered, cast, molded into shaped articles or processed into fibers.

18. A composition according to claim 15, wherein said high molecular weight organic material is an industrial or automotive paint or ink coating.

19. A process for coloring a high molecular weight organic material, which comprises incorporating an effective pigmenting amount of the pigment according to claim 1 into the high molecular weight organic material.

\* \* \* \* \*